Aug. 8, 1939.  B. H. EATON  2,168,900

NONRESONANT CAR WHEEL

Filed Jan. 21, 1936

INVENTOR
BURDICK H. EATON
By
Fred W. Lavin
ATTORNEY.

Patented Aug. 8, 1939

2,168,900

UNITED STATES PATENT OFFICE 2,168,900

NONRESONANT CAR WHEEL

Burdick H. Eaton, Los Angeles, Calif.

Application January 21, 1936, Serial No. 60,037

9 Claims. (Cl. 295—11)

My invention relates in general to vehicle wheels, and relates in particular to the type of wheel used on railway cars.

Since the invention has its principal utility in railway car wheels, I shall confine the following disclosure to such use of the invention; but it will be clearly evident from this disclosure that the features and the elements of the invention may be employed in various types of wheels, such as gear wheels, pulley wheels, vehicle wheels which do not run on tracks, etc., wherein it is desired to make the same non-resonant.

It is an object of the invention to provide a wheel which by the use of a rubber wall therein is made non-resonant, and which, although it has this wall of rubber, will have a long life and will remain concentric for a period of time greatly in excess of the normal life of the rim or tread of the wheel.

I am familiar with many of the past attempts to make so-called resilient car wheels by the use of rubber therein, but to my knowledge none of these wheels have been commercially successful due to the failure of the rubber, or due to the tread of the wheel becoming eccentric so as to render the same further unserviceable. By the use of my present invention, however, I have produced a non-resonant car wheel which by actual test is found to be practical, reliable, and durable.

It is an object of my invention to provide a nonresonant wheel having an inner or hub portion and an outer or tread portion with a wall of rubber disposed between these inner and outer portions in such a manner that the load is transmitted from the inner portion to the outer portion through tension or shear, or combined tension and shear in the rubber.

It is a further object of the invention to provide a wheel such as set forth in the preceding paragraph wherein compression in the rubber is employed only in the function of retaining the tread or outer member in concentric relation to the inner or hub member. I believe that the failure of many previous attempts to make nonresonant wheels by the use of rubber walls therein has been due to the fact that the load of the wheel has been transmitted through compression in the rubber wall, the result being that the rubber has become fatigued in a short time so as to render it of no further value. In my present invention practically the entire load is transmitted to the wheel from the inner to the outer portion thereof by the use of the aforesaid combined effect of tension and shear, it being found that under this condition of use the rubber does not quickly fatigue due to the working or stressing thereof. I am likewise aware of some attempts to produce so-called resilient railway car wheels by the placing of rubber therein so that it will operate solely in shear or tension, and I believe that in every instance these wheels have not been found practical due to the fact that the treads thereof become eccentric to the hubs in a relatively short time. In my present invention the rubber wall is so placed that it will operate under a small degree of compression to retain the concentricity of the wheel, the compressive forces in the rubber being so small that there is substantially no fatiguing of the rubber thereby.

It is a further object of the invention to provide a simple means for securing the hub and tread parts of the wheel together so that they will be securely held, this securing means being so made and installed that parts thereof will not crystallize under use, thereby avoiding all possibility of failure of the securing means while the non-resonant wheel is in service.

It is a further object of the invention to provide for use in a car wheel of the character herein described a rubber wall member having a working section and attached sealing and aligning portions, such attached portions serving to align the hub and tread parts of the wheel during the assembly thereof and to seal the rubber cavities of the assembled wheel against entry of air and water while the wheel is in service, thereby minimizing the deterioration of the rubber due to chemical reaction, such, for example, as oxidation of the rubber due to exposure to air.

Further objects and advantages of the invention will be made evident throughout the following part of the specification.

Referring to the drawing, which is for illustrative purposes only,

Figure 1:
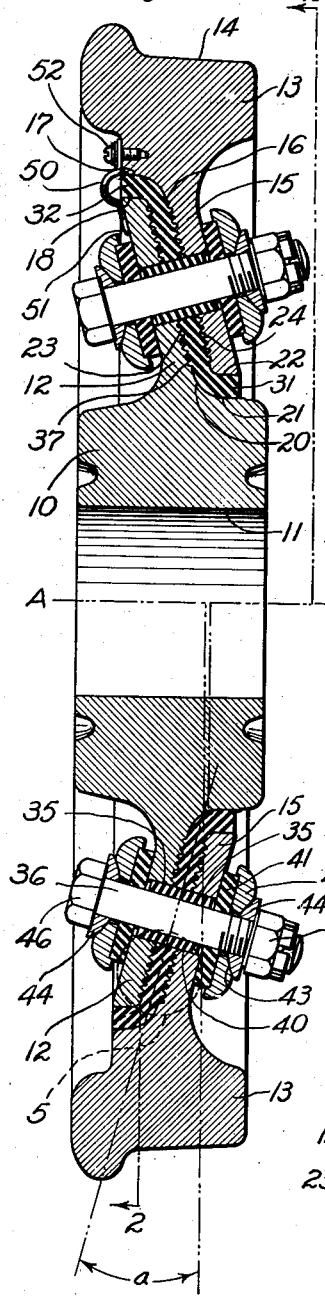
Fig. 1 is a half section, to reduced scale, of a car wheel embodying my invention.

In Fig. 1 I show a car wheel having an inner or hub portion 10 provided with an axle bore 11 and an outstanding conical fin or wall 12. This wall 12 approaches relatively close to being in a plane perpendicular to the axis A—A of the wheel. As will be hereinafter described, the wall 12 is given just sufficient conical form to produce the desired proportioning of shear-tension and compressive forces in the rubber when the load is transmitted from the hub portion 10 to an outer or rim portion 13, which, since it carries the tread 14 of the wheel, may be also referred to as the tread portion of the wheel.

As shown in Fig. 1, the tread member 13 has an inwardly extending conical wall 15 formed so as to act in companion relationship to the wall 12 of the hub portion 10. By this we mean that the cone defined by the rightward surface of the wall 12 is essentially the same as the cone defined by the leftward surface of the wall 15. The outward portion 16 of the wall 15 curves leftwardly, or merges into a shoulder 17 disposed in spaced relation to the outer end 18 of the wall 12; and likewise the inner portion 20 of the wall 12 curves rightwardly, or merges into a shoulder 21 lying in spaced relation to the inner end 22 of the wall 15. The shoulders 17 and 21 provide essentially cylindrical faces which are faced toward the cylindrical faces at the ends 18 and 22 of the walls 12 and 15. The opposing conical faces 23 and 24 of the walls 12 and 15 are serrated in such a manner that an interlocking engagement of these walls 12 and 15 will be made with a rubber wall 25 which is likewise of conical form and is disposed between the walls 12 and 15 of the inner and outer members 10 and 13 of the wheel.

Figure 2:
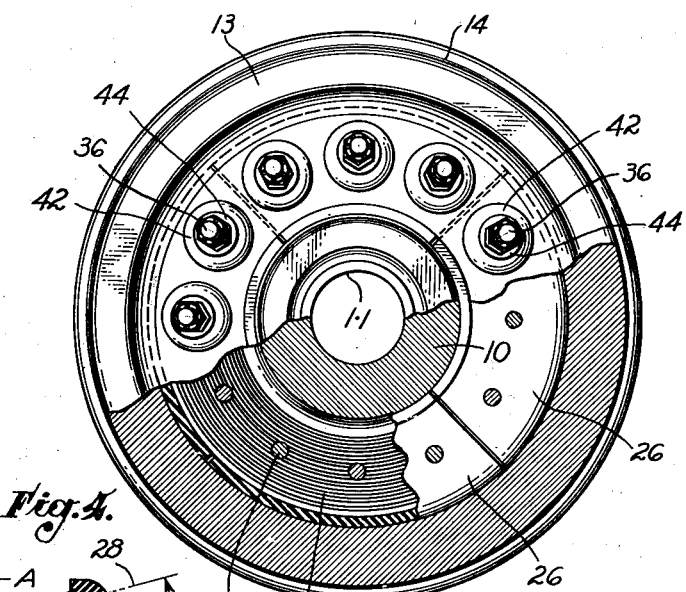
Fig. 2 is a partly sectioned face view of the wheel, drawn to further reduced scale.
Figure 4:
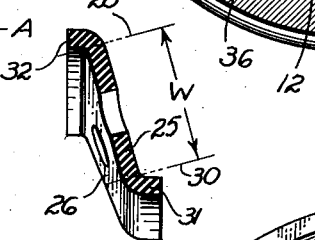
Fig. 4 is a sectional view taken as indicated by the line 4—4 of Fig. 3.
Figure 3:
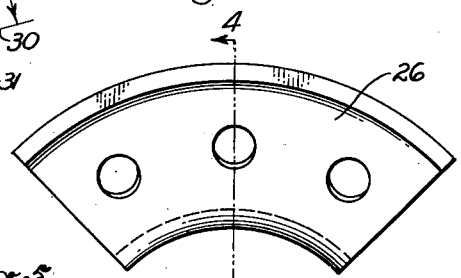
Fig. 3 is a face view of one of the rubber wall members used in the car wheel.

As shown in Figs. 2 to 4 inclusive, the rubber wall 25 consists preferably of a plurality of rubber wall sections 26 of segmental form adapted to form a circle when assembled as shown in Fig. 2. Each of the wall sections 26, as shown in Fig. 4, has a working section $w$ which is that portion included between the lines 28 and 30, and two aligning and sealing portions 31 and 32. The working section $w$ is a conical wall segment, and the aligning and sealing portions 31 and 32 are cylindrical wall sections joined respectively to the inner and outer edges of the working section $w$. The working section $w$ of the rubber wall transmits the load from the hub portion 10 to the tread portion 13, but the cylindrical portions 31 and 32 shown in Fig. 4 are not intended to carry any load; in fact, after the wheel is assembled, the portions 31 and 32 merely operate as fillers for the spaces between the shoulders 21 and 17 and the ends 22 and 18 of Fig. 1 to seal against entry of air and moisture into the space between the opposing surfaces 23 and 24 of the walls 12 and 15. The reason why essentially no load is imposed on the cylindrical wall portions 31 and 32 is that the working portion $w$ of the rubber wall 25 transmits the load with such efficiency that the relative movement of the inner and outer parts 10 and 13 of the wheel during service of the wheel is but a few thousandths of an inch, which movement is not sufficient to materially stress the cylindrical rubber wall portions 31 and 32. Accordingly, they do not act in compression to transmit the load from the hub portion 10 to the tread portion 13.

The walls 12 and 15 of the members 10 and 13 and the rubber wall 25 have aligned openings 35 therein through which bolts 36 are extended, these bolts 36 having the function of clamping the walls 12 and 15 against opposite faces of the rubber wall 25 with sufficient pressure to cause the rubber of the wall 25 to enter the serrations 37 in the wall surfaces 23 and 24. A feature of the construction is that the bolts are so placed that they operate solely in tension. No shearing or flexure strains are placed therein which might result in crystallization during service of the wheel. As will be noted from the drawing, the holes 35 are larger than the stems of the bolts 36, and the bolts 36 are held in centralization by use of tubular spacer members 40 preferably formed from a non-resonant material, such, for example, as a fairly hard rubber compound or treated fabric. Against the outer faces of the walls 12 and 15 non-resonant spacers 41 of disc form are placed, and to bear against the members 41 are metal washers 42 having spherical seats 43 in which spheroidal thrust plates 44 are seated. The head 46 and the nut 47 respectively of each bolt 36 bears inwardly against a spheroidal thrust plate 44, and the clamping force of the bolt is then transmitted through the washer 42 and the non-resonant spacer 41 to the adjacent wall member 12 or 15. Any movement transmitted to the bolts 36 as the result of the slight relative movement of the walls 12 and 15 during service of the wheel merely causes the bolts 36 to swing, at which time the spheroidal thrust plates 44 rotate in the seats 43 of the washers 42; therefore, the swinging movement of the bolts 36 does not result in the placing of shear or flexure strains therein.

In Fig. 1 I have indicated the cone angle $a$, which in this instance is the angle between the face of the cone defined by either the wall surface 23 or 24 and a plane perpendicular to the axis A—A. In the preferred practice of the invention this angle is from 14° to 16°, at which point I find that best results are obtained for the reason that at this angle the best proportioning of the shear-tension and compression forces is accomplished. In alternative practice of the invention the angle $a$ may be between 9° and 21°.

Figure 5:
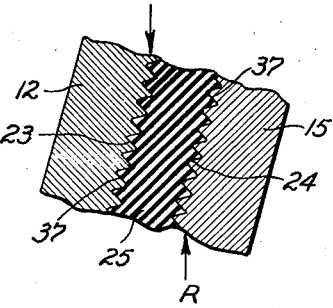
Fig. 5 is a fragmentary section, to enlarged scale, to illustrate the manner in which the forces are believed to be applied to the rubber wall of the wheel.

In Fig. 5, which is an enlargement of the section included in the dotted circle 5 of Fig. 1, I show an arrow L representing the load transmitted downwardly through the wall 12 and an arrow R representing the reaction upwardly through the wall 15 of the tread portion 13. The opposing forces L and R operate definitely in shear and flexure in the rubber wall 25. Due to the fact that the surfaces 23 and 24 are disposed at a slight angle to the directions of the forces L and R, a small degree of compression will be placed in the rubber wall 25 at the bottom of the wheel, tension will be placed in the rubber wall at the top of the wheel, and simple shear will be placed in the rubber wall at the side of the wheel. There is just sufficient conical effect in the relationship of the walls 12 and 15 to maintain the hub portion and the tread portion of the wheel in concentric relation. The serrations 37 in the opposing faces 23 and 24 of the walls 12 and 15 provide a positive interengagement between the walls 12 and 15 and the rubber wall 25, without the necessity of cementing the surfaces of the rubber wall 25 to the surfaces of the walls 12 and 15. These serrations 37 may be formed by cutting suitable annular or helical grooves in the surfaces 23 and 24, in such close side-by-side relation that sharp ridges will be formed which will be pressed into the surface of the rubber wall 25 in the manner shown in Fig. 1.

To transmit electric current from the rail to the motor, I provide on each wheel a plurality of flexible connectors such as shown at 50. The inner ends of these connectors, as indicated at 51, may be copper-soldered to the wall 12 of the inner portion 10 of the wheel, and the outer ends of the connectors 50 may be connected to the tread portion 13 by means of a suitable screw such as indicated at 52.

Herein I have used the term "rubber" in its broad sense as including the natural and synthetic materials having rubbery characteristics, and compounds of these materials. For example, in commerce an article may be referred to as being of rubber even though the actual rubber content is very small. The essential characteristics of rubber are present, however, and the broad usage of the term is accordingly acceptable.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A wheel of the character described, including: an inner portion having a radially outwardly extending wall member; an outer annular portion disposed around said inner portion, having a radially inwardly projecting wall member overlapping said outwardly extending wall member, there being aligned openings through said wall members, the axes of said openings extending in the general direction of the axis of said wheel; a rubber wall disposed between the overlapping portions of said wall members and having the surfaces thereof in non-sliding engagement with said overlapping portions of said wall members; bolt means extending through said openings, said bolt means having enlargements on the ends thereof; washers supported in ball and socket relation to said enlargements to permit swinging movement of said bolt means; and nonresonant plate members between said washers and the faces of said wall members.

2. A wheel of the character described, including: an inner portion having a radially outwardly extending wall member; an outer annular portion disposed around said inner portion, having a radially inwardly projecting wall member overlapping said outwardly extending wall member, said wall members being shaped to define a conical surface concentric with the axis of said wheel, there being aligned openings through said wall members, the axes of said openings extending in the general direction of the axis of said wheel; a rubber wall disposed between the overlapping portions of said wall members and having the surfaces thereof in non-sliding engagement with said overlapping portions of said wall members; bolt means extending through said openings, said bolt means having enlargements on the ends thereof; washers supported in ball and socket relation to said enlargements to permit swinging movement of said bolt means; and non-resonant plate members between said washers and the faces of said wall members.

3. A wheel of the character described, including: an inner portion having a radially outwardly extending wall member; an outer annular portion disposed around said inner portion, having a radially inwardly projecting wall member overlapping said outwardly extending wall member, there being aligned openings through said wall members, the axes of said openings extending in the general direction of the axis of said wheel; a rubber wall disposed between the overlapping portions of said wall members and having the surfaces thereof in non-sliding engagement with said overlapping portions of said wall members; bolts extending through said openings and having enlargements on the ends thereof; means supported in ball and socket relation to said enlargements to permit swinging movement of said bolts; and non-resonant means between said first-mentioned means and the faces of said wall members.

4. A wheel of the character described, including: an inner portion having a radially outwardly extending wall member; an outer annular portion disposed around said inner portion, having a radially inwardly projecting wall member overlapping said outwardly extending wall member, said wall members being shaped to define a conical surface concentric with the axis of said wheel, there being aligned openings through said wall members, the axes of said openings extending in the general direction of the axis of said wheel; a rubber wall disposed between the overlapping portions of said wall members and having the surfaces thereof in non-sliding engagement with said overlapping portions of said wall members; bolt elements extending through said openings, said bolt elements having enlargements on the ends thereof; means supported in ball and socket relation to said enlargements to permit swinging movements of said bolt elements; and non-resonant means between said first mentioned means and the faces of said wall members.

5. A wheel of the character described, including: an inner portion having a radially outwardly extending wall member; an outer annular portion disposed around said inner portion, having a radially inwardly projecting wall member overlapping said outwardly extending wall member, said wall members being shaped to define a conical surface concentric with the axis of said wheel, there being aligned openings through said wall members, the axes of said openings extending in the general direction of the axis of said wheel; a rubber wall disposed between the overlapping portions of said wall members and having the surfaces thereof in non-sliding engagement with said overlapping portions of said wall members; bolt elements extending through said openings, said bolt elements having enlargements on the ends thereof; and means supported in ball and socket relation to said enlargements to permit swinging movement of said bolt elements.

6. A wheel of the character described, including: an inner portion having a radially outwardly extending wall member; an outer annular portion disposed around said inner portion, having a radially inwardly projecting wall member overlapping said outwardly extending wall member, there being aligned openings through said wall members, the axes of said openings extending in the general direction of the axis of said wheel; a rubber wall disposed between the overlapping portions of said wall members and having the surfaces thereof in non-sliding engagement with said overlapping portions of said wall members; bolt elements extending through said openings, said bolt elements having enlargements on the ends thereof; and means supported in ball and socket relation to said enlargements to permit swinging movement of said bolt elements.

7. A wheel of the character described, including: an inner portion having a radially outwardly extending wall member; an outer annular portion disposed around said inner portion, having a radially inwardly projecting wall member overlapping said outwardly extending wall member, there being aligned openings through said wall members; a rubber wall disposed between the overlapping portions of said wall members and having the surfaces thereof in engagement with said overlapping portions of said wall members; non-resonant means in said openings; bolt elements extending through said non-resonant means and having enlargements on the ends thereof; a second non-resonant means engaging the faces of said wall members; washers adapted for engagement with said second non-resonant means; and thrust elements between said washers and said enlargements.

8. A wheel of the character described, including: an inner portion having a radially outwardly extending wall member; an outer annular portion disposed around said inner portion, having a radially inwardly projecting wall member overlapping said outwardly extending wall member, said wall members being shaped to define a surface concentric with the axis of said wheel, there being aligned openings through said wall members; a rubber wall disposed between the overlapping portions of said wall members; bolt elements extending through said openings, said bolt elements having enlargements on the ends thereof; and means disposed between said wall members and said enlargements to permit swinging movement of said bolt elements.

9. A wheel of the character described, including: an inner portion having a radially outwardly extending wall member; an outer annular portion disposed around said inner portion, having a radially inwardly projecting wall member overlapping said outwardly extending wall member, there being aligned openings through said wall members; a rubber wall disposed between the overlapping portions of said wall members, the opposed faces of said wall members presenting broken surfaces for non-sliding engagement with said rubber wall; non-resonant plates lying against the outer surfaces of said wall members adjacent said openings; thrust plates overlying the outer faces of said non-resonant plates; and connecting means extending through said openings flexibly interconnecting said thrust plates.

BURDICK H. EATON.